R. W. BETTS & W. HOWIE.

PULLEY.

No. 6,822. Reissued Dec. 28, 1875.

Witnesses:

John Becker.
Geo. Haynes.

Inventors:

R. W. Betts.
Wm Howie.
by their Attorney
Amos Broadnax.

THE NORRIS PETERS CO., PHOTO-LITHO., WASHINGTON, D. C.

UNITED STATES PATENT OFFICE.

ROBERT W. BETTS AND WILLIAM HOWIE, OF BROOKLYN, NEW YORK.

IMPROVEMENT IN PULLEYS.

Specification forming part of Letters Patent No. 168,708, dated October 11, 1875; reissue No. 6,822, dated December 28, 1875; application filed December 1, 1875.

*To all whom it may concern:*

Be it known that we, ROBERT W. BETTS and WILLIAM HOWIE, both of Brooklyn, in the county of Kings and State of New York, have invented an Improvement in Pulleys; and we do hereby declare the following to be a full, clear, and exact description of the same, reference being had to the accompanying drawings, making part hereof, in which—

Figure 1:
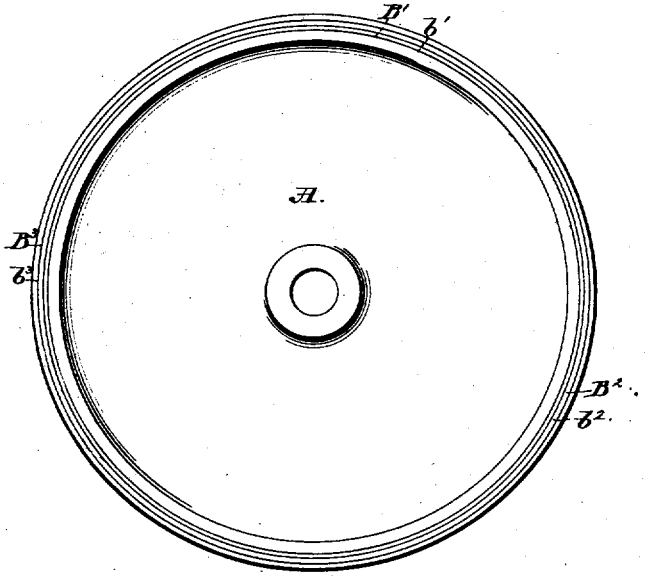
Figure 2:
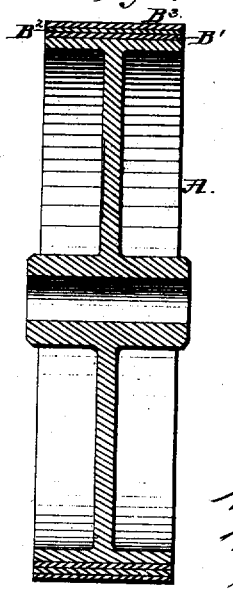

Figure 1 is a side view of a pulley constructed according to our invention, and Fig. 2 is a central transverse section of the same.

The object of our invention is to increase the friction of the belt upon the drawing-surface of the pulley, to augment the driving-power of the belt, and keep it from slipping; and our invention consists of a facing of paper, cemented or glued to the drawing-surface of a pulley to accomplish the object aforesaid.

In practicing our invention we proceed as follows: We first coat the drawing-surface of the pulley with a mixture of white lead, borax, and oil, and allow it to dry. We then wet the paper with a solution of sal-ammoniac and water, and allow it to dry. We then cut the paper in strips of the proper width and length, and coat one side of it with a strong adhesive cement or glue, and apply it to the surface of the pulley The best way to apply the paper is to have the pulley on a mandrel or shaft arranged to revolve about its own axis, and then have a roller on a separate shaft arranged on the same plane with the axis of the pulley, the surface of the roller being made to match the surface of the pulley, and its centers to be set in adjustable bearings, that the surface of the roller may be brought near to the surface of the pulley, leaving just room enough for the paper to pass between the two; then, if the cement or glue be applied to either the surface of the pulley or the paper, or both, the covering can be applied by merely turning the pulley and feeding the paper between the roller and pulley. The paper may, of course, be cut in one or more strips, and one or more thicknesses of it may be applied, and almost any variety of paper may be used, though it should not be too thick. It is better to apply two, or even three, thicknesses of thin paper than one that is too thick and soft, that will chafe or tear under the belt. Two thicknesses of common straw-board, of ordinary thickness, answer a very good purpose. It is cheap, and gives great power to the belt upon the pulley.

The preparation of the surface of the pulley may be dispensed with, provided a good marine glue or cement be used, and so may the preparation of the paper. Neither of them is absolutely essential to the success of the invention, though we think it better to prepare both the pulley and the paper; but neither is essential if the right kind of cement and paper be used.

The drawing shows a pulley covered after the plan of our invention, the essence of which is a facing or covering of paper cemented or glued upon the drawing-surface of a pulley, to increase the drawing power of the belt.

We claim, therefore, as our invention, and desire to secure by Letters Patent—

A facing or covering of paper, applied, cemented, or glued to the drawing-surface of a pulley, for the purpose of keeping it from slipping and increasing its driving-power.

R. W. BETTS.
WILLIAM HOWIE.

Witnesses:
HENRY J. WELLS,
T. JOSEPH HILGER.